(12) United States Patent
Ballas

(10) Patent No.: US 10,906,107 B2
(45) Date of Patent: Feb. 2, 2021

(54) SINGLE-SIDED FOUR-WAY INDEXABLE POSITIVE CUTTING INSERT AND INSERT MILL THEREFOR

(71) Applicant: Iscar, Ltd., Tefen (IL)

(72) Inventor: Assaf Ballas, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/855,417

(22) Filed: Apr. 22, 2020

(65) Prior Publication Data

US 2020/0246886 A1    Aug. 6, 2020

Related U.S. Application Data

(63) Continuation of application No. PCT/IL2018/051101, filed on Oct. 14, 2018.

(60) Provisional application No. 62/683,268, filed on Jun. 11, 2018.

(51) Int. Cl.
*B23C 5/20* (2006.01)

(52) U.S. Cl.
CPC ........ *B23C 5/207* (2013.01); *B23C 2210/203* (2013.01)

(58) Field of Classification Search
CPC ........ B23C 5/207; B23C 5/205; B23C 5/202; B23C 2210/203
See application file for complete search history.

(56) References Cited

U.S. PATENT DOCUMENTS

| | | | |
|---|---|---|---|
| 4,531,864 A | 7/1985 | Bylund | |
| 4,627,317 A | 12/1986 | Komanduri et al. | |
| 4,681,488 A | 7/1987 | Markusson | |
| 4,729,697 A | 3/1988 | Lacey | |
| 5,368,418 A | 11/1994 | Bentjens et al. | |
| 5,755,536 A | 5/1998 | Vollmer et al. | |
| 5,810,521 A | 9/1998 | Pantzar et al. | |
| 6,039,515 A | 3/2000 | Lamberg | |
| 6,053,671 A | 4/2000 | Stedt et al. | |
| 6,945,740 B2 | 9/2005 | Svenningsson et al. | |

(Continued)

FOREIGN PATENT DOCUMENTS

FR    2791587    10/2000

OTHER PUBLICATIONS

International Search Report dated Feb. 12, 2019, issued in PCT counterpart application (No. PCT/IL2018/051101).

(Continued)

*Primary Examiner* — Omar Flores Sanchez
(74) *Attorney, Agent, or Firm* — Womble Bond Dickinson (US) LLP

(57) ABSTRACT

A single-sided four-way indexable cutting insert includes a positive basic shape, a rake surface, a peripheral surface including four side abutment surfaces, a base bearing surface and a screw hole connecting the rake and base bearing surfaces. The insert has an imaginary square frustum which defines a square base containing the cutting insert's base bearing surface, and further defines four isosceles trapezoid side surfaces respectively containing the cutting insert's four side abutment surfaces. A material volume $V_F$ of the cutting insert and a void volume $V_S$ of the insert fulfill the condition $V_S/V_F \geq 0.25$.

22 Claims, 13 Drawing Sheets

(56) References Cited

U.S. PATENT DOCUMENTS

| | | |
|---|---|---|
| 6,957,935 B2 | 10/2005 | Sung et al. |
| 7,220,083 B2 | 5/2007 | Festeau et al. |
| 8,277,151 B2 | 10/2012 | Wandebäck |
| 8,434,974 B2 | 5/2013 | Spitzenberger |
| 8,454,279 B2 * | 6/2013 | Dufour .................. B23C 5/207 407/113 |
| 9,079,251 B2 | 7/2015 | Dufour et al. |
| 9,144,848 B2 | 9/2015 | Konta |
| 9,266,175 B2 | 2/2016 | Jaeger et al. |
| 9,586,274 B2 | 3/2017 | Nedzlek et al. |
| 10,201,856 B2 * | 2/2019 | Harif .................. B23B 27/005 |
| 10,307,840 B1 * | 6/2019 | Men ..................... B23B 51/048 |
| 10,406,609 B2 * | 9/2019 | Ballas ..................... B23C 5/06 |
| 2006/0269366 A1 | 11/2006 | Rieth |
| 2011/0299946 A1 | 12/2011 | Hecht |
| 2012/0070242 A1 | 3/2012 | Choi et al. |
| 2013/0156515 A1 | 6/2013 | Satran et al. |
| 2014/0072377 A1 | 3/2014 | Sunnvius |
| 2014/0212228 A1 | 7/2014 | Horiike et al. |
| 2015/0306687 A1 | 10/2015 | Choi et al. |
| 2016/0158854 A1 | 6/2016 | Ishi |
| 2017/0066065 A1 | 3/2017 | Burtscher |
| 2018/0015554 A1 | 1/2018 | Roman |

OTHER PUBLICATIONS

Written Opinion dated Feb. 12, 2019, issued in PCT counterpart application (No. PCT/IL2018/051101).

\* cited by examiner

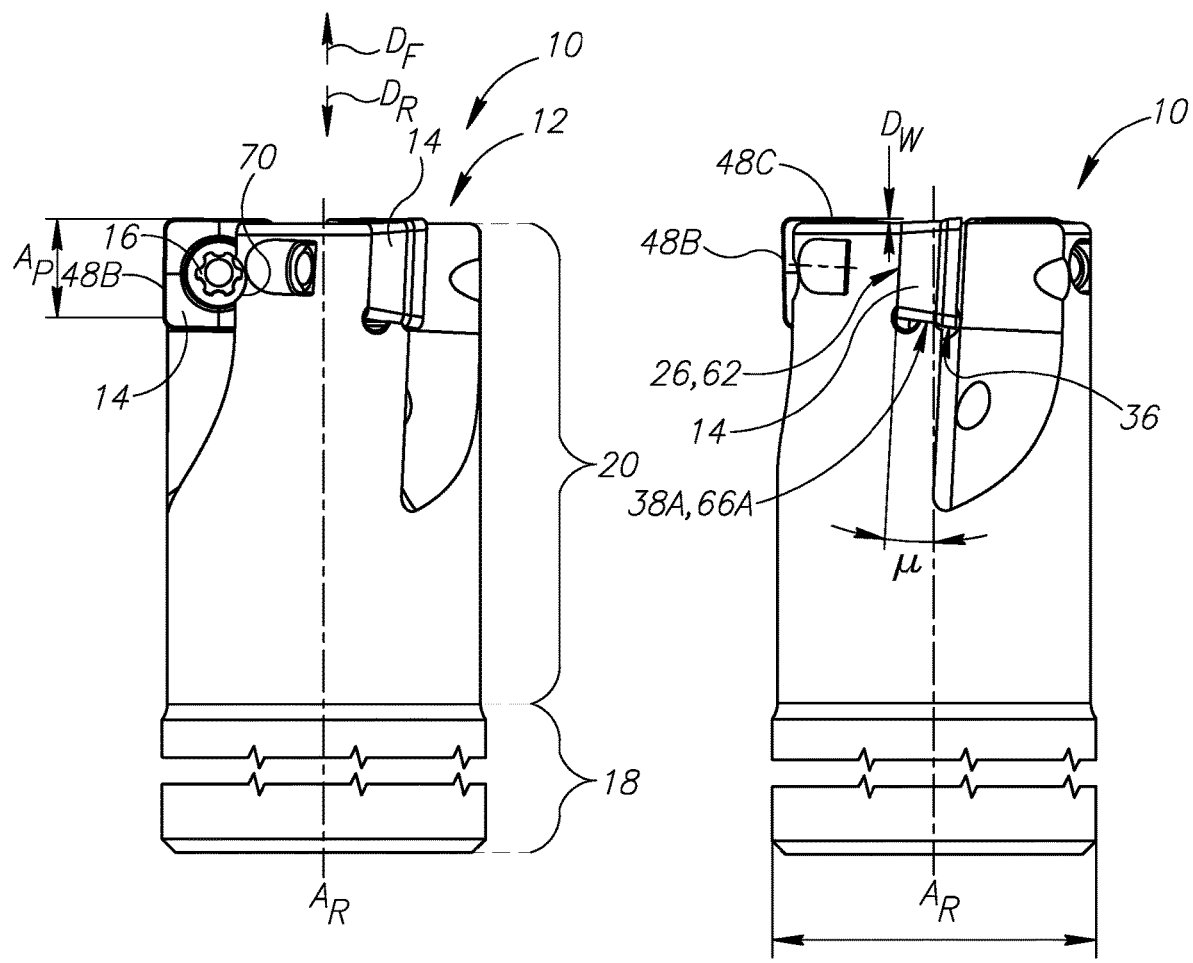
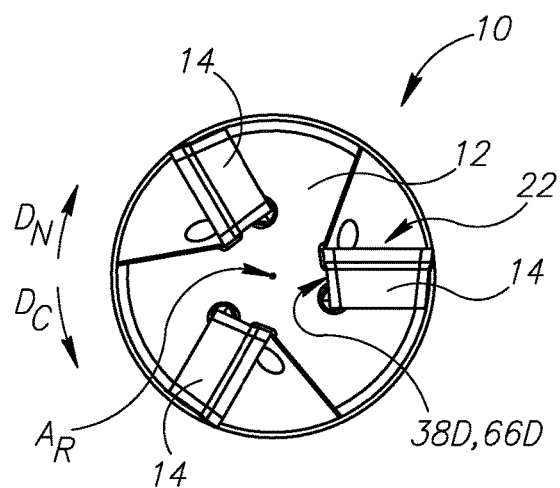
FIG.1A  FIG.1B
FIG.1C

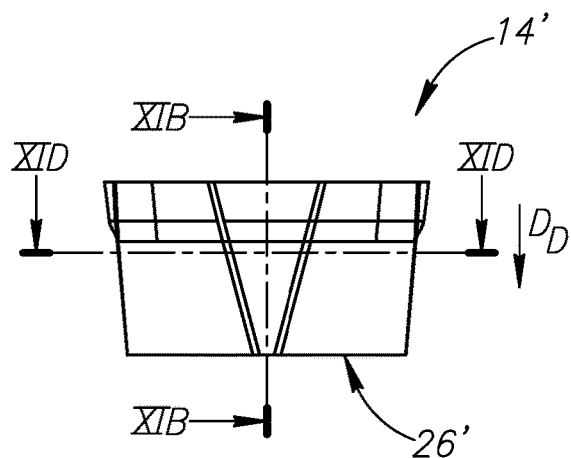
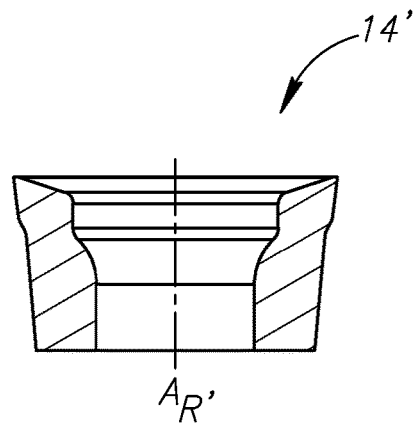
FIG.11A　　　　　　FIG.11B
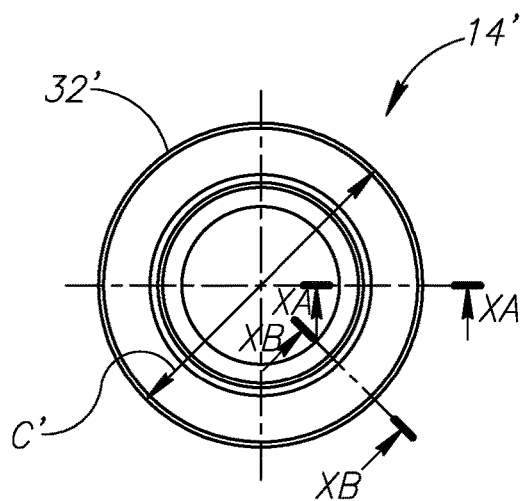
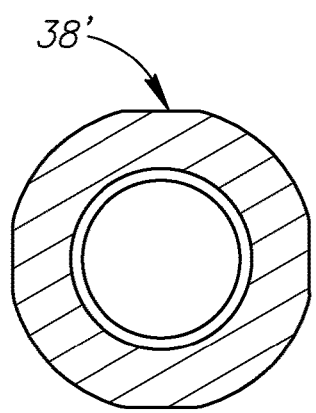
FIG.11C　　　　　　FIG.11D

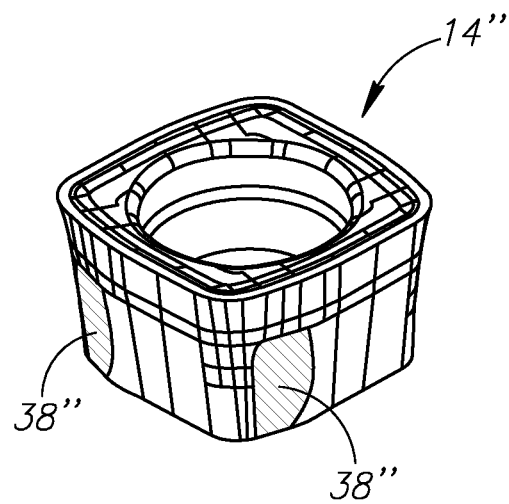
FIG.12
  
FIG.13A  FIG.13B  FIG.13C

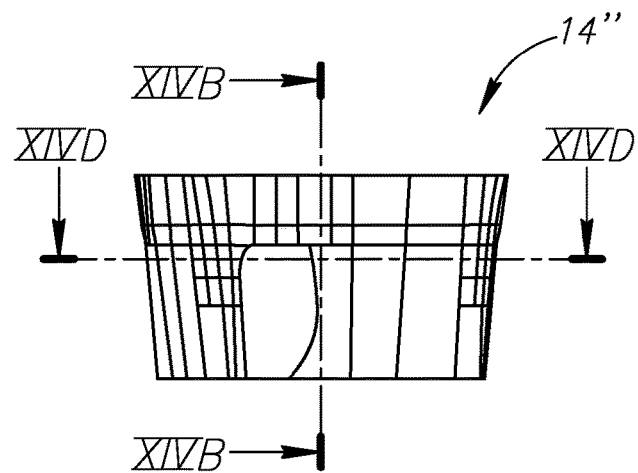
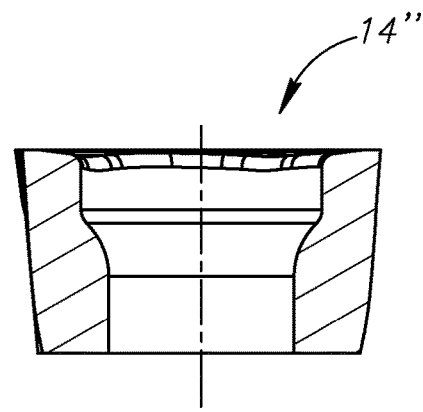
FIG.14A  FIG.14B
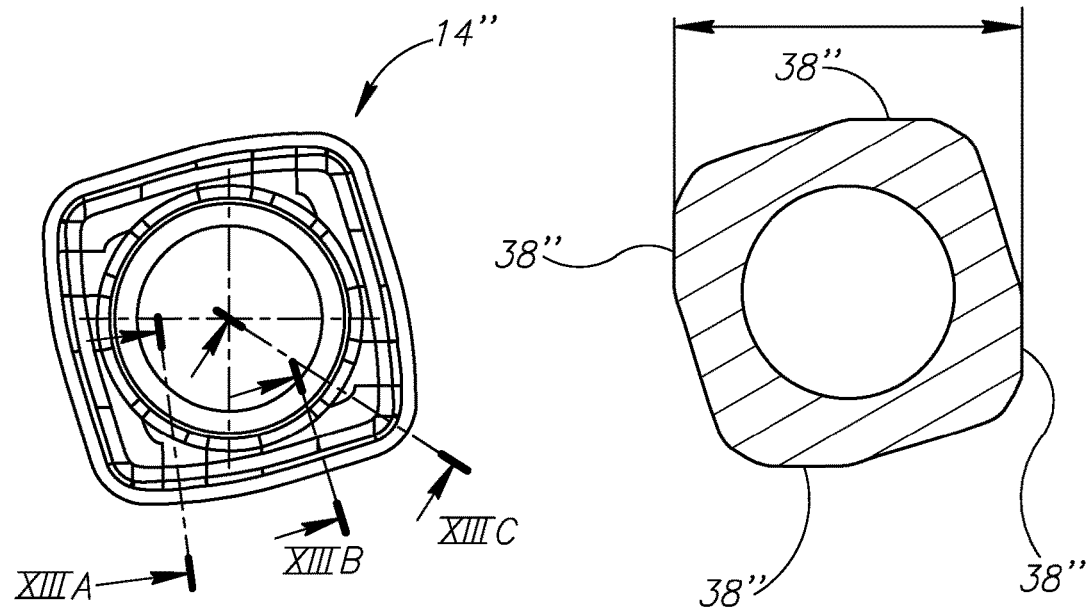
FIG.14C  FIG.14D

SINGLE-SIDED FOUR-WAY INDEXABLE POSITIVE CUTTING INSERT AND INSERT MILL THEREFOR

RELATED APPLICATIONS

This is a Bypass Continuation of PCT/IL2018/051101, filed Oct. 14, 2018 and published as WO 2019/106648A1. Priority is claimed to U.S. Provisional Patent Application No. 62/683,268, filed Jun. 11, 2018. The contents of the aforementioned applications are incorporated by reference in their entirety.

FIELD OF THE INVENTION

The subject matter of the present invention relates to single-sided four-way indexable positive cutting inserts (hereinafter also "insert(s)") and insert mills therefor. More particularly, to relatively small such inserts and tool holders configured for 90° shoulder milling operations.

BACKGROUND OF THE INVENTION

For the purposes of the present invention, end mills can be theoretically divided into two general groups, namely insert-mills and solid end mills.

Insert-mills are milling tools which comprise tool holders with pockets and replaceable inserts, typically indexable, configured to be mounted in the pockets. An advantage of insert-mills is that the replaceable inserts, which are made of comparatively expensive, harder, material constitutes a relatively small portion of the milling tool. The tool holders comprise a shank which is held securely by a collet or chuck during milling.

Unlike insert-mills which regularly require replacement of small inserts and less regularly require replacement of the tool holder, solid end mills comprise integrally formed teeth and the entire solid end mill is replaced after it is worn. Solid end mills also comprise an integrally formed shank which is held securely by a collet or chuck during milling. Accordingly, solid end mills utilize far more comparatively expensive material than insert-mills. Despite the comparatively higher cost, one of the advantages of solid end mills over insert-mills is that the solid end mill's single integrally formed body can be manufactured with a comparatively smaller diameter (typically less than 20 mm diameter, with smaller diameters being more popular, e.g., at about 12 mm diameter) allowing milling in relatively smaller locations than is possible or practical with insert-mills.

While very small inserts are known, solid end mills are still commonly preferred at the relatively smaller diameters for a variety of reasons.

Accordingly, the present invention is directed to inserts and insert mills that have a range of design features that make them functionally and economically competitive with solid end mills at cutting diameters of 20 mm and less, particularly in the range of 9 to 16 mm, preferably 9 to 12 mm.

A publication of interest is EP 3050655, which discloses single-sided two-way indexable inserts for small diameter tool holders.

It is an object of the present invention to provide a new and improved cutting insert and tool holder therefore. Particularly cutting inserts for small diameter applications and that can be used on a common tool holder. A separate object is provision of an anti-rotation construction.

SUMMARY OF THE INVENTION

The present invention provides a single-sided four-way indexable cutting insert for 90° shoulder milling operations for small diameter tool holders. Four indexable positions are typically preferred over the two indexable positions disclosed in EP 3050655, yet the design chosen in EP 3050655 was deliberately chosen to have only two indexable positions, presumably because this was the optimal design conceived by the inventors thereof for small diameter tool holders.

The present invention conceives that even at such small diameters a four-way indexable insert, e.g. of basic square shape, can be provided. Traditionally, during 90° shoulder milling operations for four-way indexable inserts, two adjacent cutting edges of the insert will be used simultaneously, one radially located cutting edge for machining laterally and another axially located cutting edge for providing a wiper function at the axial end of the insert mill. Since the cutting edge providing the wiper function already undergoes wear, it was believed that four indexable positions were not available, and such inserts were disadvantageous over the elongated two-way indexable type shown in EP 3050655, which can provide a longer cutting edge.

It will be noted that cutting inserts having more than four cutting edges on one side are known, however these inserts are not known for such small diameters. This is because, in order to compensate for the above-mentioned wear on a cutting edge used as a wiper, the cutting edge is typically not straight but comprises a small wiper portion and a larger relieved cutting edge portion. Thus the overall cutting edge length of an already small insert is reduced.

Similarly, double sided inserts with even more than four edges are known, but being able to provide clearance for such cutting inserts in extremely small diameter tool holders is problematic.

Accordingly, it has been found by the present inventor that the wiper function has not caused significant wear and a usage of the entire cutting edge, even after it has been used in a wiper position, as a main cutting edge position is possible for small diameter tool holders.

Additionally, a number of advantageous features have been incorporated, each of which is designed to allow economical production in order for an insert mill of small diameter to be competitive against solid end mills of similar diameter, as will be described below.

According to a first aspect of the present invention there is provided a single-sided, four-way indexable cutting insert having a positive basic shape and comprising: a rake surface; a base bearing surface located opposite the rake surface; an insert axis ($A_I$) extending perpendicular to the base bearing surface and through the center of the insert, the insert axis defining: an upward direction from the base bearing surface towards the rake surface, a downward direction opposite to the upward direction, and an outward direction perpendicular to the upward and downward directions and extending away from the insert axis; a cutting insert height $H_I$ measurable parallel to the insert axis, from the base bearing surface to a highest point of the rake surface; a peripheral surface connecting the rake surface and base bearing surface, the peripheral surface comprising: an unground lower sub-surface which extends upwardly and outwardly from the base bearing surface, the lower sub-surface comprising first, second, third and fourth side abutment surfaces; and an upper sub-surface connecting the lower sub-surface and the rake surface, the upper sub-surface beginning in the upward direction at a minimum upper surface height $H_U$ above the base bearing surface; a cutting edge formed along an intersection of the peripheral surface and rake surface; a screw hole opening out to the rake and base bearing surfaces, the screw hole having a void volume $V_s$; wherein: the insert has an imaginary square frustum defined by: a square base containing the base bearing surface; four isosceles trapezoid side surfaces, each extending upwardly and outwardly from the square base at an abutment surface relief angle θ fulfilling the condition 1°≤θ≤15°, and each containing a respective one of the first, second, third and fourth side abutment surfaces; and a square top connecting the four isosceles trapezoid side surfaces and located a distance equal to the cutting insert height $H_I$ from the square base; the upper sub-surface comprises at least one overhanging portion, which extends outwardly from an adjacent one of the trapezoid side surfaces and has a lowermost point at said minimum upper sub-surface height $H_U$; in a view parallel to the insert axis ($A_I$), an inscribed circle diameter $I_C$ of the cutting edges fulfills the condition $I_C$≤10 mm; and a volume ratio $V_S/V_F$ of the void volume $V_S$ and a material volume $V_F$ of the cutting insert fulfills the condition $V_S/V_F$≥0.25.

In addition to the above-mentioned discovery about the wiper surface, by utilizing a small insert, namely having an inscribed circle diameter $I_C$ of less than or equal to 10 mm, it has been found that such small inserts undergo relatively small distortion (typically a convex bulge) in the sintering process. Such distortion is traditionally dealt with by either providing a pocket lateral abutment surface with a gap (to ensure the convex insert side abutment surface securely contacts the lateral abutment surface on both sides of the gap), or by providing a pre-designed recess on the side surface of the cutting insert, or by expensive grinding of the side of the cutting insert.

Since the cutting insert of the present invention is small, the distortion is within reasonable tolerances and the above-mentioned modification of the pocket and peripheral grinding of the cutting insert can be avoided. Thus, the insert is defined as having an unground lower sub-surface. As is known in the art, ground surfaces can be identified by grinding lines and discontinuity lines where a planar ground surface ends and an unground surface starts.

Further, such pocket design is thereby also useful for small four-way indexable circular-type inserts, which typically cannot be mounted to the same pocket as they contact the center of the lateral abutment surface (and hence would contact a gap in the traditional lateral abutment surface). Further, other types of inserts such as four-way indexable feed inserts could also be used with such tool holders, making the tool holders of the present invention more versatile and hence more economical.

Accordingly, there is an additional advantageous feature of the at least one overhanging portion, which separates the peripheral portion of the insert for mounting to the insert pocket (i.e. the lower sub-surface) and the cutting portion of the insert (i.e., the cutting edge). Thus, when producing different cutting edge types (90° or circular, etc.) the same basic insert, or at least the same pocket, can be used.

Having a positive basic shape, i.e. allowing a pressing process with as little machining as possible, as disclosed in EP 3050655B1 (par. [0034]), also contributes to the economic advantage of the present design. It will be noted that the term "positive basic shape" more specifically means that cross sectional areas nearer to a base bearing surface of the insert are smaller than cross sectional areas further away therefrom, but does not require all the peripheral surfaces to be continuously slanted. For example, at certain sections of the insert the surfaces may extend parallel with an insert axis.

Finally, the amount of material of the insert itself can be minimized. It has been found that the volume ratio $V_S/V_F$ defined above has performed successfully. Naturally, minimizing the amount of material and providing four indexable positions can provide an economic advantage.

While each of the four main design features mentioned above (namely, four indexable positions, unground lower sub-surface due to small size, at least one overhanging portion, and volume minimizing material) are each individually advantageous the combination of all four elements in the present aspect is believed to provide a cutting insert with multiple advantages.

Additionally, while the intended use of the main insert of the present invention is 90° shoulder milling operations, such inserts are extremely small and versatile and hence could be used for other operations such as chamfering (by rotating a pocket orientation) or drilling, etc.

According to a second aspect of the present invention there is provided an insert mill comprising: a tool holder; and a cutting insert according to the previous aspect.

In such an insert mill, the tool holder can comprise: a shank portion; a cutting portion connected to the shank portion and comprising a pocket; and a rotation axis extending through the center of the tool holder and defining a forward direction extending from the shank portion in the direction of the cutting portion; with the pocket comprising: a seat abutment surface; a threaded pocket hole opening out to the seat abutment surface and defining a minimal pocket hole inscribed circle $I_P$ and an associated minimal pocket hole diameter $D_P$; and first and second lateral abutment surfaces oriented at a right angle to each other in a plan view of the seat abutment surface; and wherein: each of the first and second lateral abutment surfaces has an elongated continuous shape, the first and second lateral abutment surfaces being the only abutment surfaces of the pocket apart from the seat abutment surface; and the cutting insert is mounted to the pocket with the insert's base bearing surface abutting the pocket's seat abutment surface and two of the insert's adjacent side abutment surfaces abutting the pocket's first and second lateral abutment surfaces.

It should be noted that the above defined "right angle" is not meant to mean exactly 90° but rather within manufacturing tolerances, i.e. about 90°±3°, preferably 90°±1°.

As mentioned above, a four-way indexable insert with an unground lower sub-surface and a pocket as defined above allows simple production of the pocket and versatility in that the pocket can also accommodate even other types of four-way indexable inserts.

According to a third aspect of the present invention there is provided a tool holder as defined in the second aspect.

According to a fourth aspect of the present invention there is provided a four-way indexable cutting insert having a circular cutting edge and exactly four equally spaced side abutment surfaces.

According to a fifth aspect of the present invention there is provided a four-way indexable cutting insert having a volume ratio of $V_S/V_F$≥0.30.

It will be understood that a greater volume ratio utilizes less material. Accordingly it is preferred that the volume ratio fulfills the condition: $V_S/V_F$≥0.30, or even $V_S/V_F$≥0.35. An approximated maximum volume ratio for acceptable modern cutting conditions is, theoretically, believed to fulfill the condition: $V_S/V_F$≤0.55. This maximum volume ratio is particularly relevant to a circular-type insert which has extremely little material according to the present invention. With regard to square edged inserts, an approximated maximum volume ratio of $V_S/V_F \leq 0.40$ is likely the approximate maximum volume ratio.

It will be understood that even though the inscribed circle diameter $I_C$ defined above allows the lower sub-surface to be unground, even smaller sizes will allow smaller diameter tool holders to be used and/or to have additional inserts. Accordingly it is preferred that the inscribed circle diameter $I_C$ fulfills the condition: $I_C \leq 8$ mm, or even $I_C \leq 6.5$ mm, and most preferably $I_C \leq 5$ mm. An approximated minimum feasible size is believed to fulfill the condition: $I_C \geq 3.5$ mm.

It will be understood that a larger minimum upper sub-surface height $H_U$ allows a greater height of the lower sub-surface. The lower sub-surface provides a bearing function and hence a maximized height thereof provides greater stability to the insert when mounted in the pocket. Conversely, sufficient size of the upper sub-surface is needed for the cutting function. Accordingly, it is preferred that the minimum upper sub-surface height $H_U$ fulfills the condition: $0.60\ H_I \leq H_U \leq 0.90\ H_I$, or even $0.60\ H_I \leq H_U \leq 0.80\ H_I$, and most preferably $0.63\ H_I \leq H_U \leq 0.73\ H_I$.

The at least one overhanging portion can be a single continuous overhanging portion extending along the entire periphery of the insert or can be a plurality of circumferentially spaced apart overhanging portions, as is preferred in some embodiments, such as the circular edge insert, as explained below.

The cutting insert can preferably be 90° rotationally symmetric about the insert axis. Stated differently, the cutting insert can have four identical sides.

The cutting insert can comprise four identical corners and four identical straight edges connecting the corners. It will be understood that this provides a simple economic shape, free of complex geometries. Stated differently, the insert can have a basic square shaped edge with round corners. This shape can be the most preferred shape which has long straight edges for cutting.

According to one preferred example each straight edge has an edge length $L_E$ which fulfills the condition: $0.65\ I_C < L_E < 0.95 I_C$. Preferably, the edge length $L_E$ fulfills the condition: $0.75\ I_C < L_E < 0.90 I_C$. Thus, for an extremely small insert the entire straight edge on one side of the insert can serve as a main cutting edge, and the entire straight edge on an adjacent side can serve as a wiper. Notably, since the insert is so small, the entire edge constitutes a relatively large wiper (raising the concern above of wear when used as a wiper). In many known designs this is overcome by a non-straight edge, i.e. a small wiper adjacent to a corner followed by a relieved edge portion following a different direction. In the present invention, however, each straight edge can have a simpler geometry, serving as a larger wiper when in one indexed position, and then functioning as a main cutting edge after indexing of the insert. Notably, a large wiper can provide better finish on a machined workpiece.

Alternatively, the basic insert shape can have a very small straight edge and a very large corner radius for other than 90° shoulder milling operations (resembling a circular insert's operation). In such an embodiment, the edge length $L_E$ fulfills the condition: $0.10\ I_C < L_E < 0.50 I_C$, preferably $0.15\ I_C < L_E < 0.35 I_C$.

Still alternatively, the cutting edge can be, for example circular.

Most preferably, the base bearing surface is ground. In a most preferred embodiment, only the base bearing surface of the cutting insert is ground. This is the most economical production of the insert.

In some applications, it is necessary to carry out an additional rake surface grinding operation. In such an embodiment, the base bearing surface and the entire cutting edge are ground and the cutting edge is contained within the square top. Stated differently, the grinding operation is not conducted on the entire peripheral surface, but merely along the top of the insert and therefore the entire edge is contained within a plane, in this case described as being contained within the square top. It will be understood that such top grinding of the insert allows a multitude of inserts to be ground in a single pass. While this is disadvantageous in some respects, it can be offset by the pocket being inclined to provide a suitable positive cutting position.

For some applications, it is also possible to produce a cutting edge contained within the square top within desired tolerances and without such a grinding operation, which is of course preferred as it is more economical.

For greater stability, the abutment surface relief angle θ preferably fulfills the condition $2° \leq \theta \leq 8°$, and most preferably $4° \leq \theta \leq 7°$.

In order to provide suitable performance, a cutting edge land width $W_L$ measurable perpendicular to the insert axis taken at any position along the cutting edge fulfills the condition: $W_L \leq 0.14$ mm. Preferably the land width $W_L$ fulfills the condition: $0.02$ mm $\leq W_L \leq 0.14$ mm, or even more preferably $0.03$ mm $\leq W_L \leq 0.11$ mm, and most preferably $0.04$ mm $\leq W_L \leq 0.08$ mm.

The pocket is preferably slanted with respect to the rotation axis of the tool holder to compensate for a cutting edge being planar, i.e. contained in the top square.

The pocket hole can similarly be comparatively large in cross section compared with the distance to the lateral abutment surfaces. This can be seen from a pocket hole diameter and distances to the lateral surfaces.

The lateral surfaces are preferably typically oriented at the same angle as the insert's abutment surfaces.

The screw axis can preferably be offset from the center of the seat abutment surface, i.e., slightly more proximate to where the lateral surfaces are closest to each other, so that a screw holding the cutting insert to the pocket will bias the cutting insert towards the lateral surfaces.

The most advantageous application for an insert in accordance with the present invention is believed to be insert mills for cutting small diameters, particularly for the standard diameter ranges of 9.7 mm to 16 mm. Even though an insert mill of the standard diameter size of 6 mm with a single cutting insert, and insert mills of even larger diameters are possible, it is believed that they are less efficient than other tool holders at those sizes. For the small size insert exemplified ($I_C=4$ mm), insert mills at 9.7 mm diameter having two inserts, at 12 mm diameter having two or even three inserts, at 14 mm diameter having four inserts and at 16 mm diameter having five inserts are feasible. It will be noted that the present invention is most advantageous at the lower end of the diameter range mentioned, particularly 9.7 mm and 12 mm insert mills. The benefit of which can be noted by multiplying the number of inserts mentioned by four (i.e. the number of indexable positions available for each insert).

According to a sixth aspect there is provided a cutting insert comprising a rake surface, a generally planar base bearing surface, a peripheral surface connecting the rake surface and base bearing surface, a screw hole having a central axis, and a cutting edge formed at an intersection of the peripheral surface and rake surface; the insert being indexable about the central axis; the peripheral surface comprising a first side abutment surface, a first non-abutment surface adjacent to a first side abutment surface, a second side abutment surface, a second non-abutment surface adjacent to a second side abutment surface; the first side abutment surface and first side non-abutment surface being located between adjacently located first and second corners; the second side abutment surface and second side non-abutment surface being located between said second corner and a third corner adjacent to the second corner; the first and second side non-abutment surfaces each being spaced further from the central axis than the first and second side abutment surfaces.

As will be clear from the description below, not only the present aspect but any of the previous insert aspects could also comprise the feature described in the sixth aspect or as described in FIGS. 15 to 18B below (stated differently, the feature is, in summary, a pair of adjacent side abutment surfaces and side non-abutment surfaces, each side non-abutment surface being spaced further from a central axis than each side abutment surface). The advantage of which is particularly notable when portions of a cutting edge between two adjacent corners have different geometries (i.e. different cutting functions).

For example, the feature, when, for example, defining for a four-way indexable insert could be defined as: the peripheral surface further comprises a first side non-abutment surface adjacent to the first side abutment surface, a second side non-abutment surface adjacent to the second side abutment surface, a third side non-abutment surface adjacent to the third side abutment surface and a fourth side non-abutment surface adjacent to the fourth side abutment surface; wherein each of the first, second, third and fourth non-abutment surfaces are spaced further from the central axis than the first, second, third and fourth abutment surfaces.

Stated differently, a first length L1 can be measureable from a central axis $A_I$ to each side abutment surface 38', and a second length L2 can be measureable from the central axis $A_I$ to each side non-abutment surface 39'; and the first length L1 is smaller than the second length L2. In mathematical terms such relationship can be expressed as: $L2=L1+\Delta$ (where $\Delta$ is the difference between the first length L1 and second length L2). The second length L2 can preferably be defined with the following condition: 0.04 mm<$\Delta$<0.5 mm, more preferably 0.06 mm<$\Delta$<0.2 mm, and most preferably 0.06 mm<$\Delta$<0.1 mm.

Preferably, the insert is a four-way indexable cutting insert. Preferably, the cutting edges are identical for each indexed position.

Preferably, the insert is a feed insert with adjacent ramp and feed cutting edges between two adjacent corners. Preferably, each side non-abutment surface is generally located under the feed cutting edge and each side abutment surface is generally located under the ramp cutting edge.

Preferably, the adjacent side non-abutment surfaces are oriented at the same angle as the pocket's first and second lateral abutment surfaces.

Preferably, the adjacent side non-abutment surfaces are oriented at the same index angle as the side abutment surfaces.

Preferably, in a cross sectional view perpendicular to a central axis, a width of the side abutment surface is greater than a width of the side non-abutment surface.

Preferably, the peripheral surface comprises a relief sub-surface adjacent to the base bearing surface. To elaborate, the relief sub-surface is more inwardly located than the surface above it. Most preferably, the relief sub-surface is located underneath the side non-abutment surface. Additionally, it is preferable the relief sub-surface can also be located underneath the side abutment surface. Most preferably, the relief sub-surface can be located underneath both the side abutment surface and the side non-abutment surface. In the most preferred embodiment, the relief sub-surface can extend around the entire insert peripheral surface. Preferably, the relief sub-surface is convexly curved.

Preferably, the rake surface can comprise a negative land.

Preferably the rake surface can comprise a convexly curved rake surface portion adjacent to the ramp cutting edge.

BRIEF DESCRIPTION OF THE DRAWINGS

For a better understanding of the subject matter of the present invention, and to show how the same may be carried out in practice, reference will now be made to the accompanying drawings derived from a scale model, in which:

FIG. 1A is a side view of an insert mill comprising a tool holder and a plurality of inserts according to the subject matter of the present invention, rotated to show a front (i.e., axial) view of the leftmost insert;

FIG. 1B is a side view of the insert mill in FIG. 1A, rotated to show a side view of the leftmost insert in FIG. 1A;

FIG. 1C is an end view of the insert mill in FIGS. 1A and 1B;

FIG. 11A is a side view of the insert in FIG. 9;

FIG. 11B is a cross-section view taken along line XIB-XIB in FIG. 11A;

FIG. 11C is a top (i.e. axial) view of the insert in FIG. 11A;

FIG. 11D is a cross-section view taken along line XID-XID in FIG. 11A;

FIG. 12 is a perspective view of another insert and hatching schematically indicating where the trapezoid side surfaces of a square frustum (not shown) would contain the side abutment surfaces of the cutting insert;

FIG. 13A is a cross-section view taken along line XIIIA-XIIIA in FIG. 14C;

FIG. 13B is a cross-section view taken along line XIIIB-XIIIB in FIG. 14C;

FIG. 13C is a cross-section view taken along line XIIIC-XIIIC in FIG. 14C;

FIG. 14A is a side view of the insert in FIG. 12;

FIG. 14B is a cross-section view taken along line XIVB-XIVB in FIG. 14A;

FIG. 14C is a top (i.e. axial) view of the insert in FIG. 14A;

FIG. 14D is a cross-section view taken along line XIVD-XIVD in FIG. 14A;

DETAILED DESCRIPTION

Figure 2:
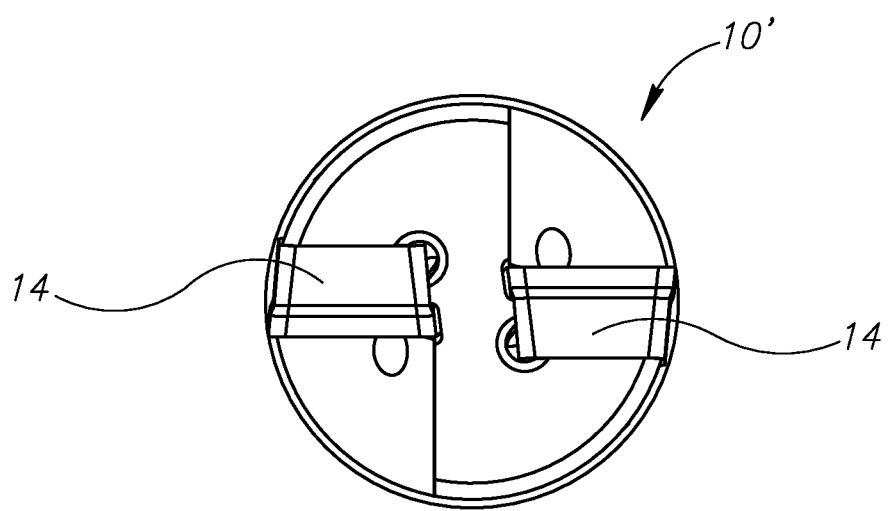
FIG. 2 is an end view of an insert mill, similar to the insert mill shown in FIGS. 1A to 1C, except with two inserts.

FIGS. 1A to 1C illustrates an insert mill 10 configured for 90° shoulder milling operations.

The insert mill 10 comprises a tool holder 12, cutting inserts 14 and screws 16 for securing the cutting inserts 14 to the tool holder 12.

The insert mill 10 is configured for rotating about a rotation axis $A_R$ which extends longitudinally through the center thereof.

The rotation axis $A_R$ defines opposite axially forward and rearward directions $D_F$, $D_R$, and opposite rotational cutting and non-cutting directions $D_C$, $D_N$.

The tool holder 12 comprises a shank portion 18 and a cutting portion 20 extending forward therefrom.

The cutting portion 20 comprises one or more pockets 22.

Figure 3:
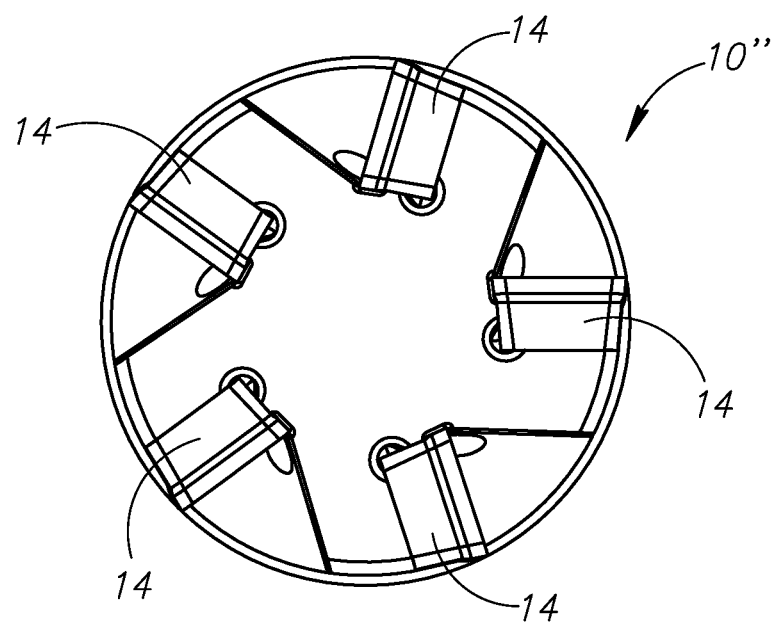
FIG. 3 is an end view of an insert mill, similar to the insert mill shown in FIGS. 1A to 1C, except with five inserts.
Figure 8A:
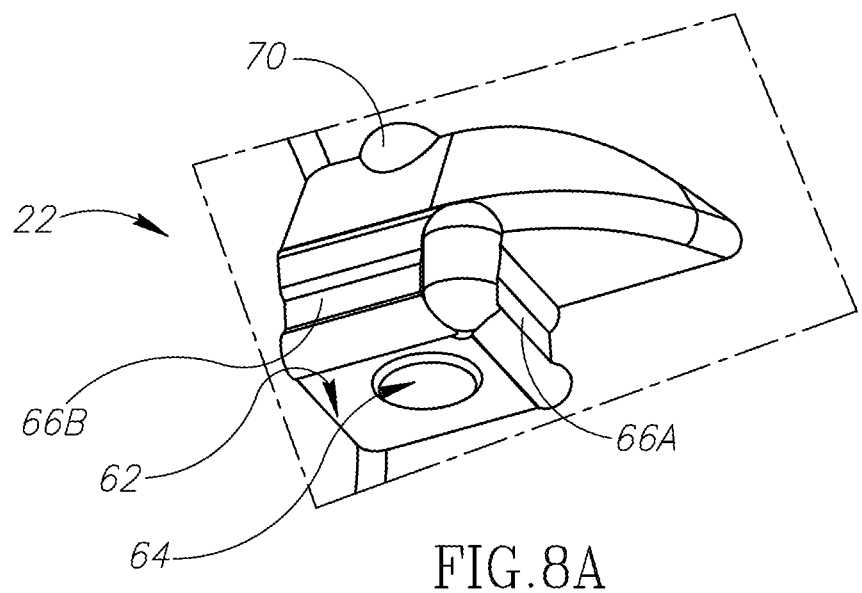
FIG. 8A is a perspective view of a pocket of any one of the insert mills in FIGS. 1A to 3.
Figure 8B:
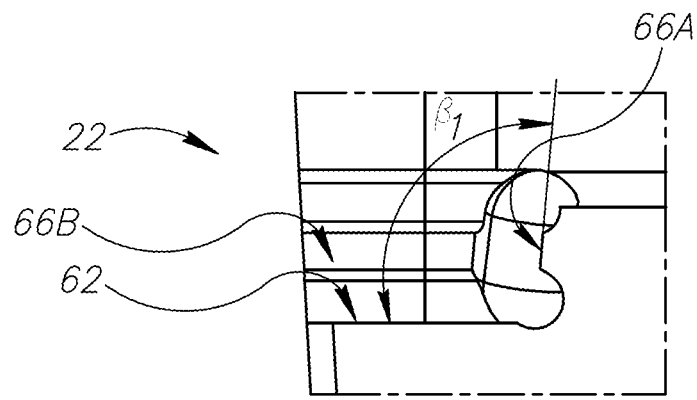
FIG. 8B is a side view of the pocket in FIG. 8A.
Figure 8C:
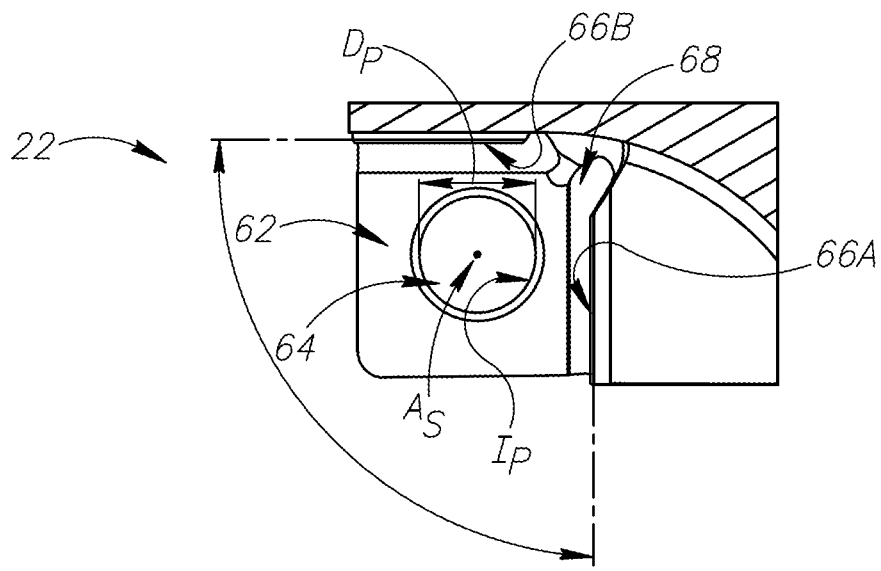
FIG. 8C is a top (i.e. axial) view of the pocket in FIG. 8A, and also constitutes a plan view of the seat abutment surface of the pocket.

In the example shown in FIGS. 1A-1C, there are three pockets 22 (shown without inserts in FIGS. 8A to 8C). For smaller diameter tool holders it is only possible to provide less pockets, for example a two pocket embodiment of an insert mill 10' is shown in FIG. 2. For larger diameter tool holders more pockets may be provided as shown in the tool holder 10" in FIG. 3.

The cutting inserts 14, screws 16 and pockets 22, in the examples given, are identical, therefore features described with respect to one should be considered to apply to all.

The cutting insert 14 will now be described with reference to FIGS. 4-6C.

The cutting insert 14 is a single-sided four-way indexable cutting insert having a positive basic shape. It comprises a rake surface 24, a generally planar base bearing surface 26, a peripheral surface 28, a screw hole 30, and a cutting edge 32.

An insert axis $A_I$ (FIG. 6A) extends perpendicular to the base bearing surface 26 and through the center of the insert 14. The insert axis $A_I$ is provided to assist defining directions and features of the cutting insert 14. Generally speaking, while it is most preferred that a screw hole of the present invention is located in the center of an insert and is perpendicular to a base bearing surface, resulting in an insert axis of the insert also extending through the center the screw hole, it will be understood that it is possible a screw hole can be slanted or not perfectly central to a cutting insert, resulting in a screw hole axis (not shown) which is not coaxial with the insert axis $A_I$ (whereas in the present preferred example they are coaxial). Nonetheless, given that the present invention seeks to minimize material usage to the greatest extent possible, certainly for the purposes of structural strength the exemplified central and perpendicular screw hole is preferred.

The insert axis $A_I$ defines opposite upward and downward directions $D_U$, $D_D$, and opposite inward and outward directions $D_I$, $D_O$. The outward direction $D_O$ is not meant to define one specific direction but rather all possible 360° outward directions from the insert axis $A_I$, three such directions being exemplified. This is also true, in the opposite direction, for the inward direction $D_I$.

Figure 4:
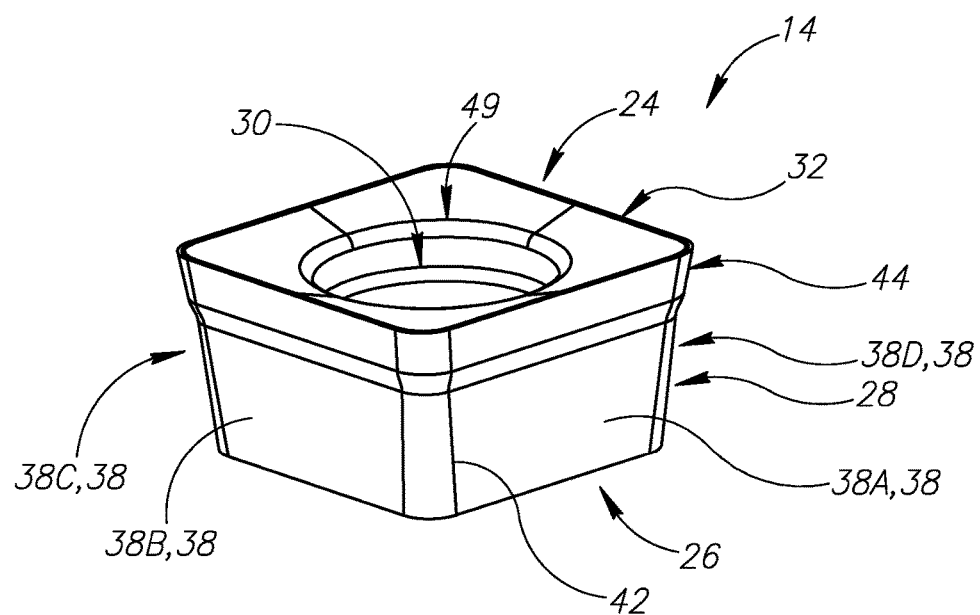
FIG. 4 is a perspective view of the leftmost insert shown in FIG. 1A.
Figures 5A, 5B, 5C:
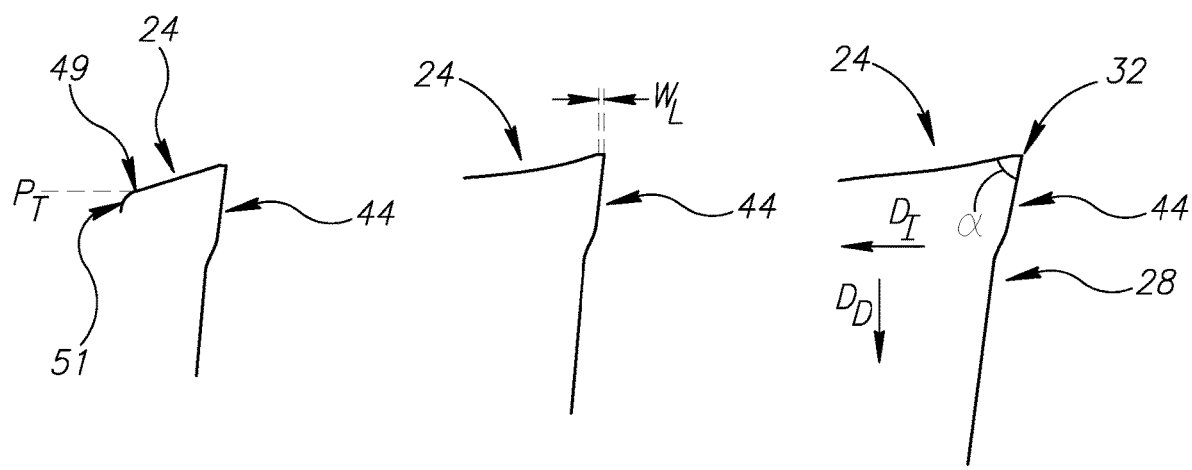
FIG. 5A is a cross-section view taken along line VA-VA in FIG. 6C.
FIG. 5B is a cross-section view taken along line VB-VB in FIG. 6C.
FIG. 5C is a cross-section view taken along line VC-VC in FIG. 6C.

As shown, for example in FIGS. 4 and 5C, the rake surface 24 can preferably slope inwardly and downwardly from the cutting edge to form an acute internal angle α for chip forming purposes.

Figures 7A, 7B, 7C:
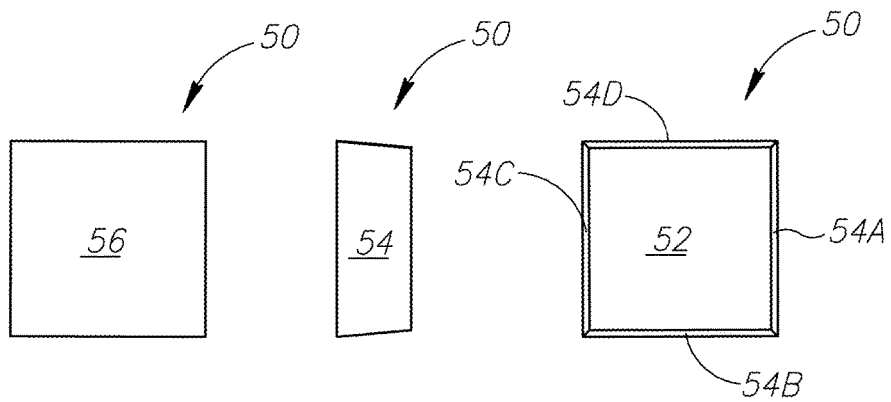
FIG. 7A is a top view of an imaginary square frustum, showing the square top thereof.
FIG. 7B is a side view of the square frustum in FIG. 7A, showing an isosceles trapezoid side surface thereof.
FIG. 7C is a bottom view of the square frustum in FIG. 7A, showing the four isosceles trapezoid side surfaces thereof and the square base thereof.

The base bearing surface 26 is generally planar as shown, but it will be understood that this definition does not preclude the possible inclusion of a small rounded transition edge between the peripheral surface and the base bearing surface, as shown for example in FIG. 7 of EP 3050655.

Figure 6A:
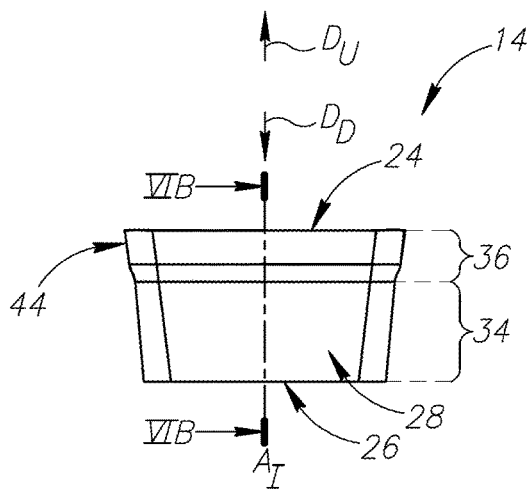
FIG. 6A is a side view of the insert in FIG. 4.

Referring to FIGS. 4 and 6A, the peripheral surface 28 comprises a lower sub-surface 34 and an upper sub-surface 36. The lower sub-surface 34 is unground and extends upwardly and outwardly from the base bearing surface 26, and comprises first, second, third and fourth side abutment surfaces 38A, 38B, 38C, 38D. (In FIG. 4 only 38A and 38B are shown and the positions of 38C and 38D, which are hidden, are schematically identified; hereinafter the identical side abutment surfaces will be identified generally as "side abutment surface(s) 38").

Figure 6B:
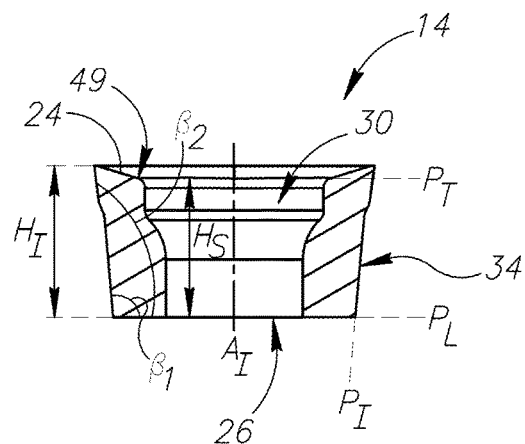
FIG. 6B is a cross-section view taken along line VIB-VIB in FIG. 6A.

Referring to FIGS. 6A and 6B, the positive basic shape of the cutting insert 14 means that the lower sub-surface 34 forms an obtuse internal angle $\beta_1$ with the base bearing surface 26. Preferably, although optionally, the upper sub-surface 36 forms an obtuse internal angle $\beta_2$ with the base bearing surface 26. Alternatively, it is possible for the upper sub-surface 36 to be, for example, perpendicular to the base bearing surface 26.

Figure 6C:
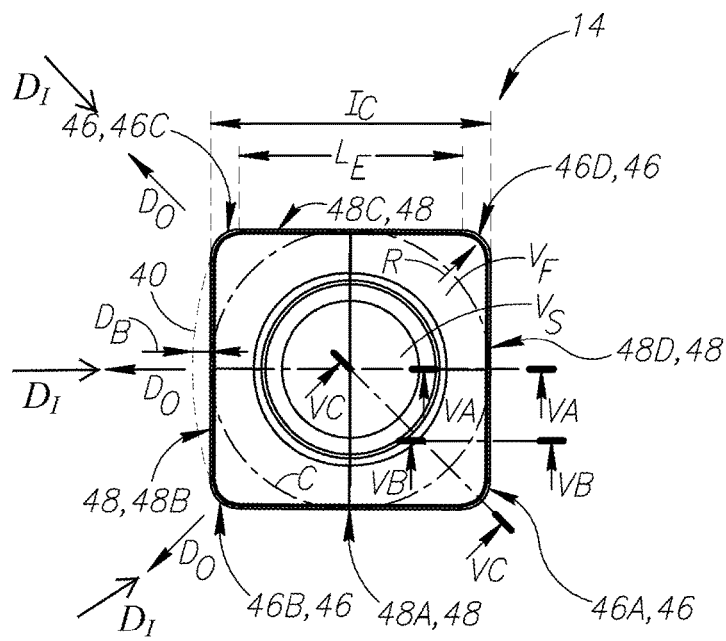
FIG. 6C is a top (i.e. axial) view of the insert in FIG. 6A.

Each of the side abutment surfaces 38 is generally planar. To elaborate, an exaggerated schematic convex bulge 40 is shown in FIG. 6C. The bulge 40 typically results from a sintering process. Since the inserts of the present invention are small, distortion resulting in such bulge 40 is acceptably small enough for them not to require grinding. Generally speaking, such convexity or concavity (not shown; which can be considered an inward "bulge" for the purposes of the specification) is measured as a maximum distance from a plane connecting adjacent corners of an insert to such bulge.

Thus, the insert is stated to have unground lower sub-surface. Even though in FIG. 4, for example, it appears to have a discontinuity line 42, this is merely a result of this particular drawing showing a curvature line. An actual product which has not been ground does not have a discernable line, and smoothly transitions from the generally planar portion to the radius.

The upper sub-surface 36 comprises at least one overhanging portion 44, described below further in reference to FIGS. 7A to 7G.

Referring to FIG. 6C, the cutting insert 14 can comprise four identical corners 46A, 46B, 46C, 46D (hereinafter generally referred to as "corner(s) 46") and four identical straight edges 48A, 48B, 48C, 48D (hereinafter generally referred to as "straight edge(s) 48") connecting the corners.

Dimensions of various features are shown as follows: each corner can have a radius R (FIG. 6C); each straight edge 48 can have an edge length $L_E$ measured from the transition point of the radius of the corners (FIG. 6C); a cutting edge land width $W_L$ is shown in FIG. 5B; and an imaginary inscribed circle C, and a diameter $I_C$ thereof is shown in FIG. 6C.

Referring to FIGS. 6B and 6C, a void volume $V_S$ of the cutting insert 14 is defined by the boundaries of the screw hole 30. Specifically, a screw hole height Hs is defined from the base bearing surface 26 to an upper edge 49 of the screw hole 30 (also designated in FIG. 4). Stated differently, the void volume $V_S$ is calculated as the volume of the void extending from a bottom of the screw hole 30, defined at a lower plane $P_L$ perpendicular to the insert axis $A_I$ and essentially coplanar with the base bearing surface 26, to a top of the screw hole 30 defined at an upper plane $P_T$ perpendicular to the intersection of the screw hole 30 and the rake surface 24, i.e. at the height of the upper edge 49. More precisely, as shown in FIG. 5A, the upper edge 49 is an intersection of a curved corner 51 of the screw hole 30 and the rake surface 24.

The material volume $V_F$ is, as its name states, the volume of the actual material of which the cutting insert 14 is made.

Figures 7D, 7E:
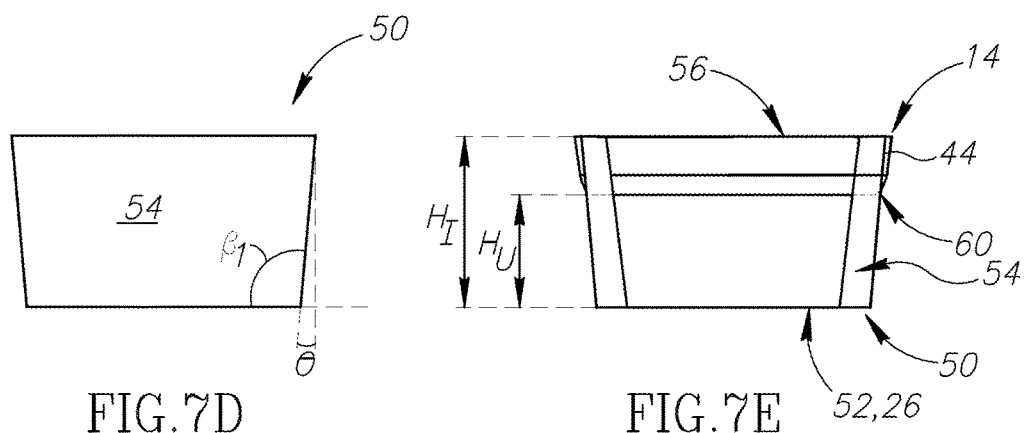
FIG. 7D is another side view of the square frustum in FIG. 7A, rotated.
FIG. 7E is a schematic side view of the insert in FIG. 4, shown within the square frustum.
Figures 7F, 7G:
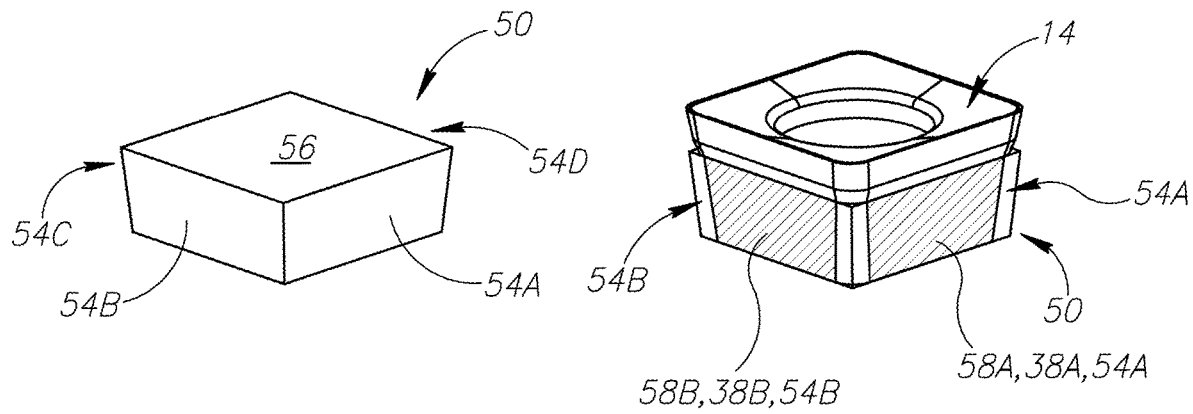
FIG. 7F is a perspective view of the square frustum in FIG. 7A.
FIG. 7G is a schematic perspective view of the insert in FIG. 4, shown within a portion of the square frustum and hatching schematically indicating where the trapezoid side surfaces of the square frustum contain the side abutment surfaces of the cutting insert.

Referring now to FIGS. 7A to 7G, an imaginary square frustum 50 is shown comprising a square base 52, four identical isosceles trapezoid side surfaces 54A, 54B, 54C, 54D (noting that in FIG. 7F only 54A and 54B are shown and the positions of 54C and 54D, which are hidden, are schematically identified; hereinafter generally referred to as "trapezoid side surface(s) 54") and a square top 56 which is larger than the square base 52.

Each trapezoid side surface 54 extends upwardly and outwardly from the square base 52 (or, equivalently, downwardly and inwardly from the square top 56) at an abutment surface relief angle θ fulfilling the condition 1°≤θ≤15° (FIG. 7D).

The hatching, schematically designated as 58A, 58B in FIG. 7G (noting that not the entire height of the square frustum is shown) schematically shows where the first and second side abutment surfaces 38A, 38B are respectively contained within the isosceles trapezoid side surfaces.

Similarly, the square base 52 contains the base bearing surface 26.

As, in this example, the cutting edge 32 is located at a single height, i.e. a cutting insert height $H_I$ from the square base 52, the square top 56 contains the cutting edge 32.

FIG. 7E shows, in a side view, where the at least one overhanging portion 44 extends further outward from the isosceles trapezoid side surfaces 54. In this example, there is only a single overhanging portion 44, continuously extending around the entire periphery of the insert.

The upper sub-surface 36 (FIG. 6A) begins, in the upward direction, at a minimum upper sub-surface height $H_U$ above the base bearing surface 26, the minimum upper sub-surface height $H_U$ being measurable parallel to the insert axis $A_I$. The at least one overhanging portion 44 has a lowermost point 60 at the minimum upper sub-surface height $H_U$ above the base bearing surface 26.

Referring now to FIGS. 8A to 8C, the pocket 22 comprises a seat abutment surface 62, a threaded pocket hole 64 opening out to the seat abutment surface 62 and defining a minimal pocket hole inscribed circle $I_P$ and an associated minimal pocket hole diameter $D_P$, first and second lateral abutment surfaces 66A, 66B oriented at a right angle to each other in a plan view (i.e. the view in FIG. 8C) of the seat abutment surface 62.

The pocket hole 64 can similarly be comparatively large in cross section compared with the distance to the lateral abutment surfaces. This can be seen from the pocket hole diameter $D_P$ and the distances from the pocket hole 64 to the lateral abutment surfaces 66A, 66B.

The first and second lateral surfaces 66A, 66B are preferably typically oriented at the same obtuse internal angle $\beta_1$ as the insert's abutment surfaces 38.

A screw axis As can preferably be offset from a center of the seat abutment surface, i.e. slightly more proximate to where the lateral surfaces are closest to each other (i.e. the area generally designated 68) so that a screw holding the cutting insert to the pocket will bias the cutting insert towards the lateral surfaces.

Referring now to FIGS. 1A to 1C, a tool recess 70 is preferably provided so that a tool can easily access a screw 16 mounted to the pocket 22.

When mounted, the screw 16 secures the cutting insert 14 such that the base bearing surface 26 abuts the seat abutment surface 62, the first abutment surface 38A abuts the first lateral surface 66A, and an adjacent abutment surface 66 (in this example the fourth abutment surface 38D, shown in FIG. 1C) abuts the second lateral surface 66B. It will be understood that the cutting insert 14 can be indexed four times in the pocket 22 and that the exact designation of which specific abutment surfaces contact at any given time is not important.

More importantly, it is noted that the upper sub-surface 36 does not contact the tool holder 12 and therefore inserts with different cutting edges can be mounted on the same tool holder 12.

The pocket is preferably slanted in the forward direction $D_F$ and cutting direction $D_C$ with respect to the rotation axis $A_R$, as shown by a slant angle μ. The slant angle μ can preferably fulfill the condition $2° \leq μ \leq 5°$.

In FIG. 1B, for the insert mill 10 exemplified, one of the straight cutting edges (for example the third straight edge 48C) performs a wiper function and only protrudes a small wiper distance $D_W$ from the tool holder. Notably the orientation thereof is at a right angle to the rotation axis $A_R$. In this example, the second straight edge 48B is the main cutting edge for providing a 90° shoulder milling operation.

Referring to FIG. 1A, since the entire cutting edge 48 (exemplified as the second straight edge 48B) is straight and generally parallel to the rotation axis $A_R$, a comparatively large cut depth $A_P$ is achievable for a comparatively very small cutting insert. For the same reason, this is similarly true that the entire third straight edge 48C provides a comparatively large wiper, generally perpendicular to the rotation axis $A_R$.

Referring now to FIGS. 9 to 11D, a different insert embodiment, i.e., a circular insert 14', is shown. The pocket's first and second lateral abutment surfaces 66A, 66B have no gap in the center thereof, as is typically provided to counter an insert bulge described above. Because the pocket's first and second lateral abutment surfaces 66A, 66B are devoid of a gap, a circular insert such as the cutting insert designated 14', which will abut the center portions of the first and second lateral abutment surfaces 66A, 66B can be used in the exact same pocket 22 as the previously described insert 14.

The circular insert 14' is a single-sided four-way indexable cutting insert having a positive basic shape. Apart from the shapes of the cutting edge 32', side abutment surfaces 38' and overhanging portions 44', the circular insert 14' can be considered to be otherwise similar to the previously described insert 14. Accordingly, only significant differences will be detailed.

Reference numerals corresponding to those used in the previously described insert, but suffixed with an apostrophe (') should be considered to have comparative function.

The cutting edge 32' is completely circular and hence also corresponds to the imaginary inscribed circle C'.

The side abutment surfaces 38' can preferably but optionally taper in the downward direction $D_D$ (FIG. 11A). Stated differently, they can have a frustum shape (noting that it is not a triangular shape since the overhanging portion is not included as part of the side abutment surface).

Figure 9:
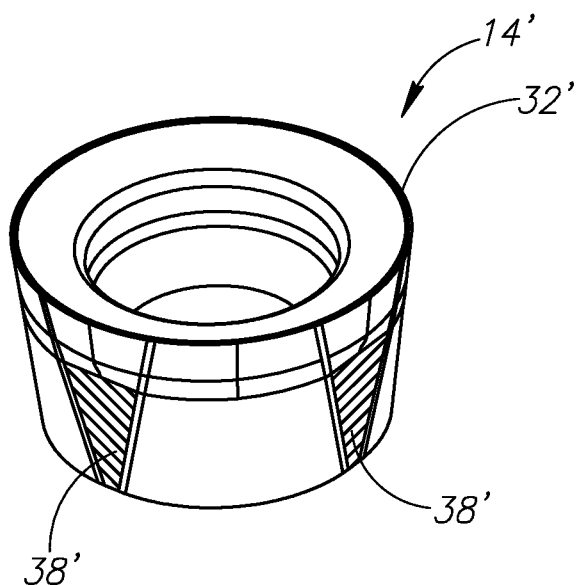
FIG. 9 is a perspective view of another insert and hatching schematically indicating where the trapezoid side surfaces of a square frustum (not shown) would contain the side abutment surfaces of the cutting insert.

While the tapering shape extends from the cutting edge 32' to the base bearing surface 26', it will be understood that the abutment of the side abutment surfaces 38' and the pocket's lateral abutment surfaces will only be with the hatched portions, two of which are shown in FIG. 9.

Figures 10A, 10B:
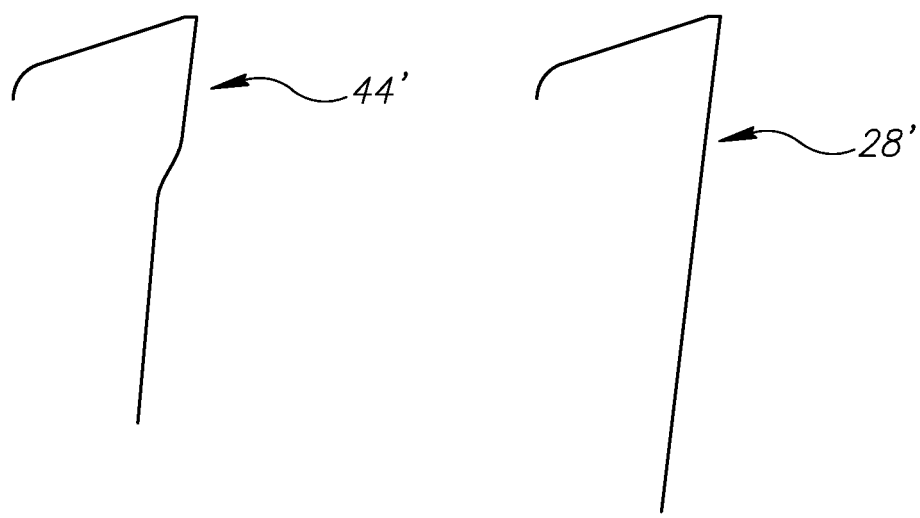
FIG. 10A is a cross-section view taken along line XA-XA in FIG. 11C.
FIG. 10B is a cross-section view taken along line XB-XB in FIG. 11C.

Finally, it will be noted that at least one overhanging portion 44' is actually four spaced-apart, separate overhanging portions. As shown in FIG. 10B, in contrast to FIG. 10A, certain circumferential portions of the peripheral surface 28' are devoid of any overhanging portion 44'. FIG. 10A is view through a cross section through the center of the side abutment surface 38' as understood from FIGS. 11C and 11D. By having a plurality of spaced-apart overhanging portions, both a fully circular cutting edge can be achieved while still having four generally planar side abutment surfaces vertically separated from the cutting edge for providing four distinct indexing positions.

Referring now to FIGS. 12 to 14D, a different insert embodiment, i.e. a feed insert 14", is shown.

The feed insert 14" is similar to the previous inserts in most respects except that the cutting edge has been designed for feed milling (i.e. comprising combined ramping and feed machining capability. Accordingly, only significant differences will be detailed.

Reference numerals corresponding to those used in the previously described insert, but suffixed with two apostrophes (") should be considered to have comparative function.

The feed insert 14" merely exemplifies that the side abutment surfaces 38" can be located in a position other than the center of the side surface of the insert. Stated differently, they can be generally planar only adjacent to corners of the insert. The hatched portions of the side abutment surfaces 38" in FIG. 12 will similarly be contained within the above described isosceles trapezoid side surfaces. Thus the same tool holder 12 can also be used to provide a feed function.

Referring now to FIGS. 15 to 17D, a different insert 14''' is shown.

The feed insert 14''' is similar to the previous inserts and particularly the insert designated 14", since both have a cutting edge has been designed for feed milling (i.e. comprising combined adjacent ramping and feed cutting edges (or sub-edges) adjacent to each other).

Unless specified to the contrary, features with similar reference numerals are similar or identical to the previous inserts. Significant differences are detailed below.

The cutting insert 14''' is a single-sided four-way indexable cutting insert having a positive basic shape. It comprises a rake surface 24''', a generally planar base bearing surface 26''', a peripheral surface 28''', a screw hole 30''', and a cutting edge 32'''.

An insert axis $A_I$ (FIG. 6A) extends perpendicular to the base bearing surface 26''' and through the center of the insert 14'''.

Figure 17A:
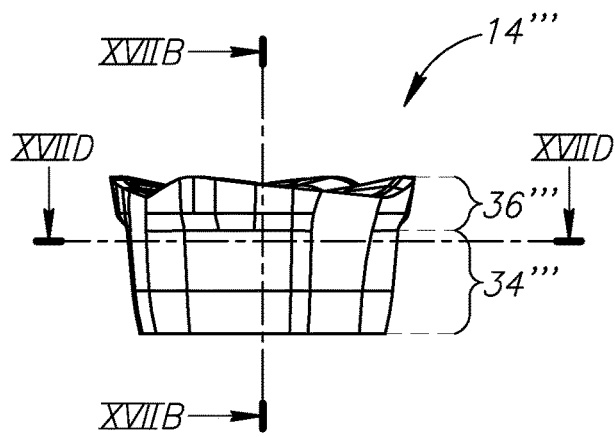
FIG. 17A is a side view of the insert in FIG. 15.
Figure 17B:
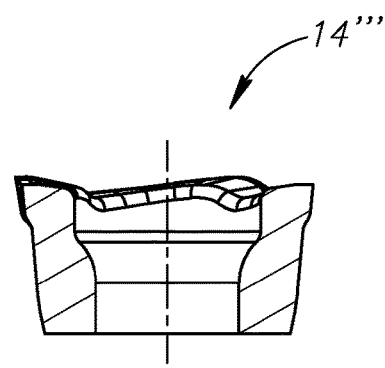
FIG. 17B is a cross-section view taken along line XIIVB-XIIVB in FIG. 17A.
Figure 17C:
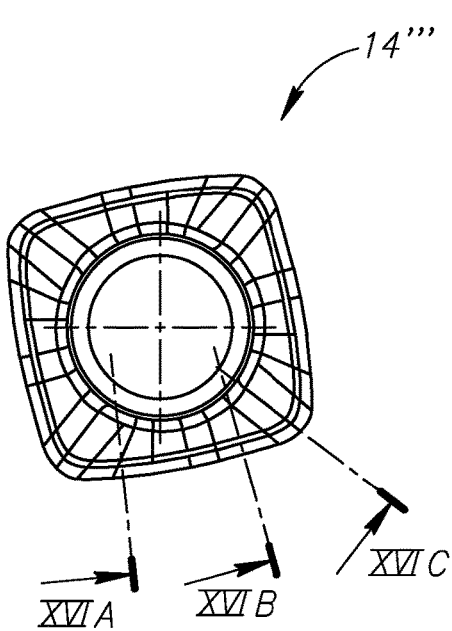
FIG. 17C is a top (i.e. axial) view of the insert in FIG. 17A.

Referring to FIG. 17A, it can be seen that the insert's the peripheral surface 28''' comprises a lower sub-surface 34''' and an upper sub-surface 36'''.

Directing attention first to the lower sub-surface 34''', there are four identical side abutment surfaces 38''' corresponding in function to those described above.

Unlike the previous inserts, portions of the peripheral surface 28''' located adjacent to the side abutment surfaces 38''' have been designed for a special function and have consequently been given a name, namely side non-abutment surfaces 39'''.

More precisely, between each side abutment surface 38''' and a non-adjacent corner 41''' of the same side abutment surface there is a side non-abutment surfaces 39'''.

Figure 15:
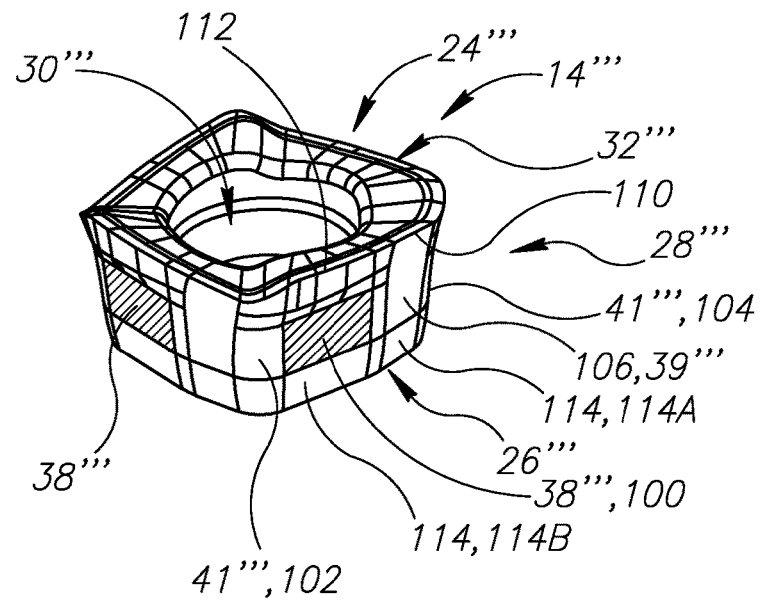
FIG. 15 is a perspective view of another insert and hatching schematically indicating where the trapezoid side surfaces of a square frustum (not shown) would contain the side abutment surfaces of the cutting insert.

For example, using FIG. 15, additional reference numerals (i.e. in addition to 38''' and 39''') added for explanation only. A first side abutment surface designated 100 (also generally designated 38''') is located between a so-called adjacent corner 102 and a non-adjacent corner 104. Between the first side abutment surface 100 and the non-adjacent corner 104 is a so-called non-abutment surface 106 (also generally designated 39'''). Between each pair of adjacent corners there are corresponding side abutment surfaces and side non-abutment surfaces, however as they are identical they will not be described.

Similar to the previous examples, the hatching shown for each side abutment surface 38''' schematically shows where the insert's side abutment surfaces 38''' are respectively contained within the above-described isosceles trapezoid side surfaces, which also abuts a tool's pocket when mounted correctly thereto.

As noted above, the pocket of the present invention can accommodate different inserts, and unlike typical prior art design is not configured differently for each different type of four-way indexable insert.

During testing, it was unexpectedly found that it was possible to mount the feed insert 14″ in FIG. 14 incorrectly to the pocket of the present invention, i.e. in a rotated position from the correct position. This derived from two unusual circumstances.

A first circumstance was that the adjacent non-abutment surfaces located between the abutment surfaces 38″ were oriented at basically the same index angle as the pocket's first and second lateral abutment surfaces 66A, 66B (in this example 90°; i.e. which is also the same index angle as the intended adjacent abutment surfaces 38″), which allows an operator the chance to mistakenly secure the insert using non-abutment surfaces.

A second circumstance in which the insert has two different functioning sub-edges adjacent to each other (i.e. between adjacent corners). Accordingly, while such incorrect mounting would not be problematic with an insert having all symmetric edges, in the case of a fast feed insert or other type of insert with non-identical adjacent functioning edges, such incorrect mounting is unacceptable.

To reduce the likelihood, and preferably eliminate, said incorrect mounting the side non-abutment surfaces 39‴ were spaced from the central axis $A_I$ of the insert 14‴ a greater distance than the abutment surfaces 38‴.

Figure 17D:
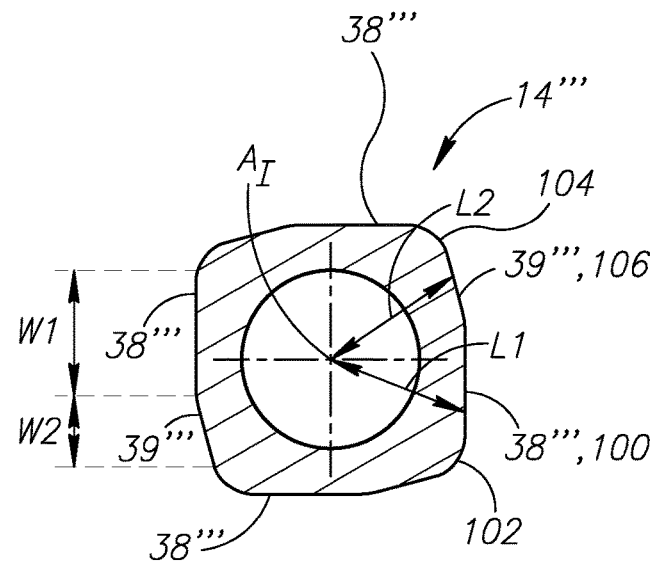
FIG. 17D is a cross-section view taken along line XIIVD-XIIVD in FIG. 17A.

To elaborate with an example, referring to FIG. 17D, a first length L1 measured from the central axis $A_I$ (i.e. the center of the insert) to the side abutment surface 38‴ (the side abutment surface exemplified is also designated 100) is smaller than a second length L2 measured from the central axis $A_I$ (i.e. the center of the insert) to the adjacent side non-abutment surface 39‴ (also designated 106). In mathematical terms such relationship can be expressed as: L2=L1+Δ(where Δ is the difference).

Notably, from the drawing it is hard to see the length difference as it is very small. In the given example L1=1.9 mm and L2=1.98 mm. Noting that an inscribed circle of the insert 14‴ measuring within the side abutment surfaces 38‴ is consequently twice the magnitude of L1, i.e. 3.8 mm (i.e. 3.8 mm is an inscribed diameter of the abutment surfaces 38‴).

Stated differently, the exemplified above mentioned difference Δ is 0.08 mm or approximately 2% of an inscribed diameter of the abutment surfaces. A minimum working value of the difference Δ is estimated to be about 0.04 mm (i.e. below which the desired effect preventing incorrect mounting may not be effective) and a maximum working value is estimated to be about 0.5 mm. Consequently, a second length L2 from the central axis $A_I$ to a non-abutment surface is preferably 0.04 mm<Δ<0.5 mm, more preferably 0.06 mm<Δ<0.2 mm, and most preferably 0.06 mm<Δ<0.1 mm Referring now to FIGS. 18A and 18B, the effect of the above feature is shown in a pocket 22 and is identical with that previously described.

To reiterate the relevant features for this example, the pocket 22 comprises a threaded pocket hole 64, first and second lateral abutment surfaces 66A, 66B and a screw axis As extending through the center of the threaded pocket hole 64.

Figure 18A:
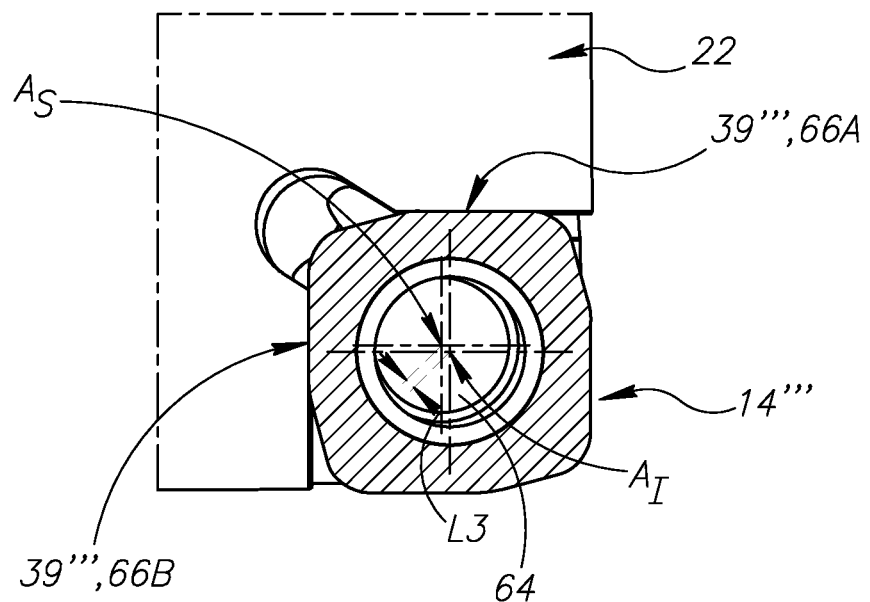
FIG. 18A is a top view of a pocket corresponding to the pocket in FIGS. 8A to 8C comprising an insert according to FIGS. 15 to 17D but only showing a cross section view corresponding to FIG. 17D, the insert being in a correct mounting position.

In the correct mounted position in FIG. 18A, two adjacent the side abutment surfaces 38‴ abut the first and second lateral abutment surfaces 66A, 66B and as a result the insert's central axis $A_I$ and the pocket hole's screw axis As are spaced a relatively small third length L3 from each other. Accordingly, a screw (not shown) can be inserted through the insert's screw hole 30‴ and the pocket hole 64 to secure the insert 14‴ to the pocket 22.

Figure 18B:
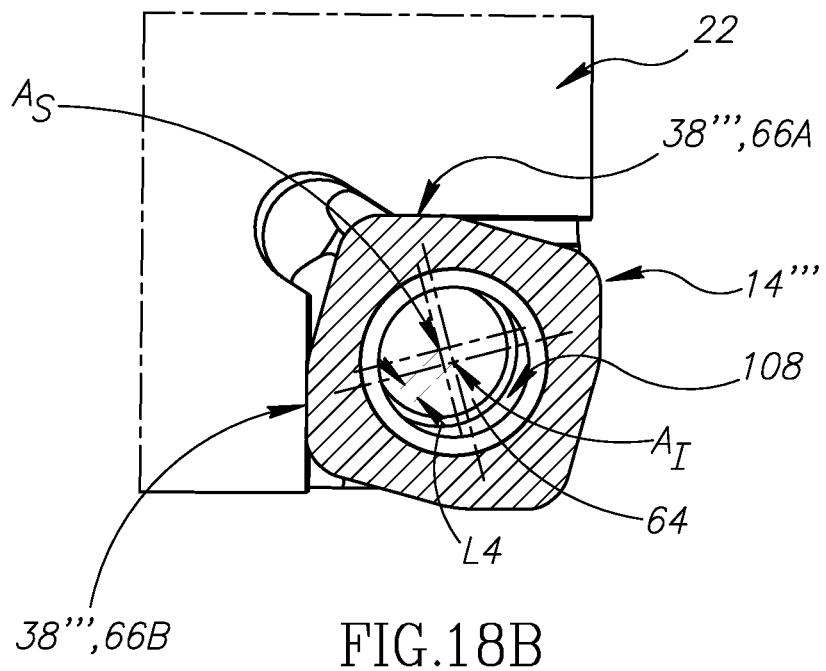
FIG. 18B is a similar view to FIG. 18A except that the insert is shown in an incorrect mounting position.

By contrast, in the incorrect mounted position in FIG. 18B, adjacent side non-abutment surfaces 39‴ abut the first and second lateral abutment surfaces 66A, 66B and as a result the insert's central axis $A_I$ and the pocket hole's screw axis $A_S$ are spaced a relatively larger fourth length L4 from each other (i.e. fourth length L4 being relatively larger than length L3). Accordingly, a screw (not shown) is impeded from being inserted through the insert's screw hole 30‴ due part of the edge 108 of the pocket hole 64 protruding in it's path.

It has been observed that the non-abutment surfaces 39‴ can cause the insert 14‴ to automatically adjust or rotate into the correct mounted position as shown in FIG. 18A when an operator is securing the insert 14‴ to the pocket hole 64.

The present embodiment is a fast feed insert, however due to the interesting discovery of having two different possible abutment surfaces (i.e. an abutment surface adjacent to a non-abutment surface, both of which being possibly used for mounting an insert to a pocket), it is noted that such feature (increasing the length of one of the abutment surfaces to greater than the other to prevent incorrect mounting) could also be reversed. This could be, for example if the cutting edge would not be configured as a fast feed cutting edge but if, for example, the adjacent corner edges of the insert could be functional to provide a typical milling insert.

Stated differently, referring to FIG. 15, for a fast feed insert (not necessarily the exemplified fast feed insert 14‴ being used for explanatory purposes only), the non-abutment surfaces (39‴, 106; being positioned further from the central axis $A_I$ than the intended abutment surfaces) are positioned below the main cutting edges 110 and not below the ramping edges 112, and the abutment surfaces (38‴, 100) are positioned below the ramp cutting edges 112.

As shown in FIG. 17D, a first width W1 of the side abutment surface is greater than a second width W2 of the side non-abutment surface. It will be understood that this was a preferred but non-limiting way to push the side non-abutment surface 39‴ further from the central axis $A_I$. It will be understood that such modification also affects the connected side abutment surface 38‴.

While the main concept of the present example has been described above, which in itself is even a separate patentable aspect, some preferred features for such concept are as follows.

As a result of the side non-abutment surfaces 39‴ being spaced further than the side abutment surface 38‴ from the central axis $A_I$, the insert peripheral surface 28‴ is further formed with a relief sub-surface 114 adjacent to the base bearing surface 26‴.

The relief sub-surface 114 has been included since, during translational motion of the insert 14‴ during milling, there is increased likelihood of the insert peripheral surface 28‴ undesirably contacting a workpiece (not shown).

A more important addition of the relief sub-surface 114 is underneath the non-abutment surface 39‴ (designated 114A) which is most likely to contact a workpiece (not shown) as it protrudes further from the center of the insert 14‴. However there is also increased likelihood that the area underneath the abutment surface 38‴ may contact a workpiece and hence said relief sub-surface 114 is also added underneath the insert abutment surface 38''' (designated 114B). For ease of production the relief sub-surface 114 extends around the entire insert peripheral surface 28'''.

Notably, adding said relief sub-surface 114 under the insert abutment surface 38''' is somewhat disadvantageous since it reduces stability (due to a smaller abutment area), but is believed to be overall beneficial. Accordingly, such addition of the relief sub-surface 114 along any portion of the insert peripheral surface 28''' is a preferred but non-limiting option.

In this preferred but non-limiting example the relief sub-surface 114 is convexly curved.

Figures 16A, 16B, 16C:
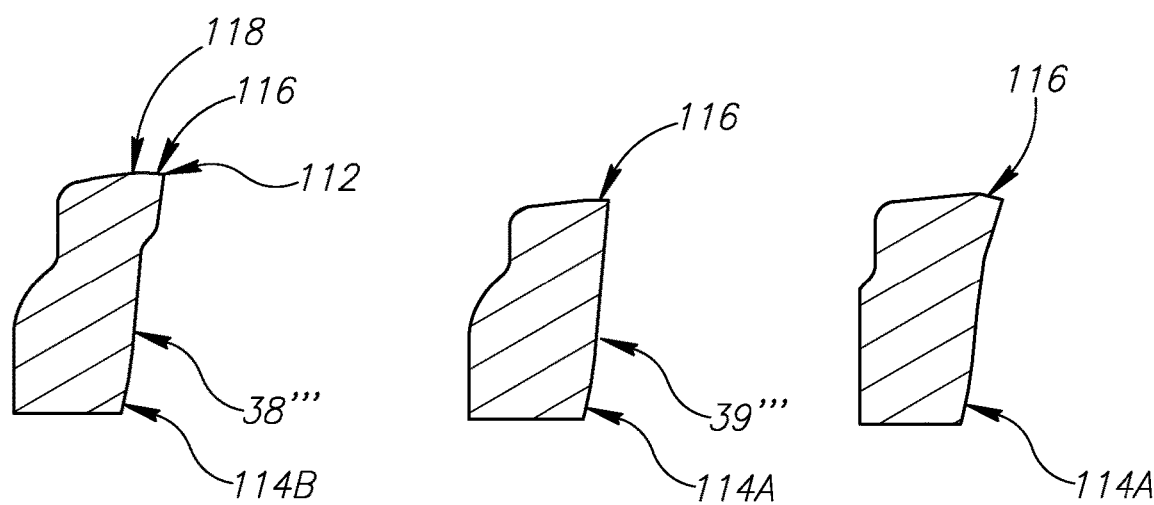
FIG. 16A is a cross-section view taken along line XVIA-XVIA in FIG. 17C.
FIG. 16B is a cross-section view taken along line XVIB-XVIB in FIG. 17C.
FIG. 16C is a cross-section view taken along line XVIC-XVIC in FIG. 17C.

Another preferred but optional feature, shown best in FIG. 16A, is a neutral or even negative land 116. As described above, it is preferable that a rake surface slope inwardly and downwardly from the cutting edge to form an acute internal angle α for chip forming purposes. However, similar to that stated above, as a result of the increased likelihood of contact with a workpiece due to the non-abutment surface being outwardly spaced, it is preferred to reinforce the cutting edge, even at the detriment caused to cutting efficiency. Such reinforcement even is added in the form of a convexly curved rake surface portion 116 adjacent to the ramp cutting edge 112.

What is claimed is:

1. A single-sided, four-way indexable cutting insert having a positive basic shape and comprising:
   a rake surface;
   a base bearing surface located opposite the rake surface;
   an insert axis AI extending perpendicular to the base bearing surface and through a center of the insert, the insert axis defining: an upward direction from the base bearing surface towards the rake surface, a downward direction opposite to the upward direction, and an outward direction perpendicular to the upward and downward directions and extending away from the insert axis;
   a cutting insert height HI measurable parallel to the insert axis, from the base bearing surface to a highest point of the rake surface;
   a peripheral surface connecting the rake surface and base bearing surface, the peripheral surface comprising:
      an unground lower sub-surface which extends upwardly and outwardly from the base bearing surface, the lower sub-surface comprising first, second, third and fourth side abutment surfaces; and
      an upper sub-surface connecting the lower sub-surface and the rake surface, the upper sub-surface beginning in the upward direction at a minimum upper surface height HU above the base bearing surface;
   a cutting edge formed along an intersection of the peripheral surface and rake surface; and
   a screw hole opening out to the rake and base bearing surfaces, the screw hole having a void volume $V_S$;
   wherein:
   the insert has an imaginary square frustum defined by:
      a square base containing the base bearing surface;
      four isosceles trapezoid side surfaces, each extending upwardly and outwardly from the square base at an abutment surface relief angle θ fulfilling the condition 1°≤θ≤15°, and each containing a respective one of the first, second, third and fourth side abutment surfaces; and
      a square top connecting the four isosceles trapezoid side surfaces and located a distance equal to the cutting insert height HI from the square base;
   the upper sub-surface comprises at least one overhanging portion, which extends outwardly from an adjacent one of the trapezoid side surfaces and has a lowermost point at said minimum upper sub-surface height HU;
   in a view parallel to the insert axis AI, an inscribed circle diameter IC of the cutting edges fulfills the condition IC≤10 mm;
   a volume ratio VS/VF of the void volume VS and a material volume VF of the cutting insert fulfills the condition VS/VF≥0.25; and
   the peripheral surface further comprises a first side non-abutment surface adjacent to the first side abutment surface, a second side non-abutment surface adjacent to the second side abutment surface, a third side non-abutment surface adjacent to the third side abutment surface and a fourth side non-abutment surface adjacent to the fourth side abutment surface; wherein each of the first, second, third and fourth non-abutment surfaces are spaced further from the central axis than the first, second, third and fourth abutment surfaces.

2. The cutting insert according to claim 1, wherein the volume ratio fulfills the condition: 0.30≤VS/VF≤0.60.

3. The cutting insert according to claim 1, wherein inscribed circle diameter IC fulfills the condition: 3.5 mm≤IC≤6.5 mm.

4. The cutting insert according to claim 3, wherein the inscribed circle diameter IC fulfills the condition: 3.5 mm≤IC≤5 mm.

5. The cutting insert according to claim 1, wherein the minimum upper sub-surface height HU fulfills the condition: 0.60HI≤HU≤0.90HI.

6. The cutting insert according to claim 1, wherein the at least one overhanging portion is a plurality of overhanging portions.

7. The cutting insert according to claim 1, wherein the cutting edge comprises four identical corners and four identical straight edges connecting the corners.

8. The cutting insert according to claim 7, wherein each straight edge has an edge length LE which fulfills the condition: 0.65IC<LE<0.95IC.

9. The cutting insert according to claim 1, wherein only the base bearing surface of the cutting insert is ground.

10. The cutting insert according to claim 1, wherein the base bearing surface and the entire cutting edge are ground and the cutting edge is contained within the square top.

11. The cutting insert according to claim 1, wherein the cutting edge is circular.

12. The cutting insert according to claim 1, wherein a first length L1 is measureable from the central axis AI to each side abutment surface, and a second length L2 is measureable from the central axis AI to the each side non-abutment surface; the first length L1 being smaller than the second length L2 and a difference Δ between them fulfills the condition: L2=L1+Δ.

13. The cutting insert according to claim 12, wherein the difference Δ fulfills the condition: 0.04 mm<Δ<0.5 mm.

14. The cutting insert according to claim 1, wherein the insert is a feed insert with adjacent ramp and feed cutting edges between each pair of adjacent corners.

15. The cutting insert according to claim 14, wherein each non-abutment surface is generally located under one of the feed cutting edges and the abutment surface is generally located under one of the ramp cutting edges.

16. The cutting insert according to claim 14, wherein peripheral surface comprises a relief sub-surface adjacent to the base bearing surface.

17. The cutting insert according to claim 16, wherein the relief sub-surface is convexly curved.

18. The cutting insert according to claim 1, wherein the rake surface comprises a negative land.

19. The cutting insert according to claim 1, wherein the rake surface comprises a convexly curved rake surface portion adjacent to a ramp cutting edge.

20. The cutting insert according to claim 1, wherein a first width W1 of each side abutment surface is greater than a second width W2 of the each non-abutment surface.

21. An insert mill comprising:
a tool holder; and
a cutting insert according to claim 1, seated in the tool holder; wherein:
the tool holder comprises:
a shank portion;
a cutting portion connected to the shank portion and comprising a pocket; and
a rotation axis extending through the center of the tool holder and defining a forward direction extending from the shank portion in the direction of the cutting portion;
the pocket comprises:
a seat abutment surface;
a threaded pocket hole opening out to the seat abutment surface and defining a minimal pocket hole inscribed circle IP and an associated minimal pocket hole diameter DP; and
first and second lateral abutment surfaces oriented at a right angle to each other in a plan view of the seat abutment surface;
each of the first and second lateral abutment surfaces has an elongated continuous shape, the first and second lateral abutment surfaces being the only abutment surfaces of the pocket apart from the seat abutment surface; and
the cutting insert is mounted to the pocket with the insert's base bearing surface abutting the pocket's seat abutment surface, and two of the insert's adjacent side abutment surfaces abutting the pocket's first and second lateral abutment surfaces.

22. The insert mill according to claim 21, wherein: the cutting edge is circular; and the insert's two adjacent side abutment surfaces abut center portions of the pocket's first and second lateral abutment surfaces.

* * * * *